US008189134B2

(12) United States Patent
LeCave

(10) Patent No.: US 8,189,134 B2
(45) Date of Patent: May 29, 2012

(54) DURABLE DISPLAY PANEL WITH IMPACT RESISTANCE

(75) Inventor: Michael LeCave, Gainsville, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 740 days.

(21) Appl. No.: 12/330,041

(22) Filed: Dec. 8, 2008

(65) Prior Publication Data

US 2010/0075071 A1  Mar. 25, 2010

Related U.S. Application Data

(63) Continuation-in-part of application No. 12/234,182, filed on Sep. 19, 2008.

(51) Int. Cl.
*G02F 1/1333* (2006.01)
(52) U.S. Cl. .......................................................... 349/60
(58) Field of Classification Search .................. 349/60, 349/158, 58, 73–74
See application file for complete search history.

(56) References Cited

U.S. PATENT DOCUMENTS

| 4,715,686 | A | * | 12/1987 | Iwashita et al. | 349/137 |
| 5,606,438 | A | * | 2/1997 | Margalit et al. | 349/60 |
| 5,835,179 | A | * | 11/1998 | Yamanaka | 349/161 |
| 6,219,127 | B1 | * | 4/2001 | Hirakata et al. | 349/153 |
| 6,392,727 | B1 | | 5/2002 | Larson et al. | |
| 6,472,032 | B1 | | 10/2002 | Asano | |
| 6,731,367 | B1 | * | 5/2004 | Saitoh | 349/158 |
| 6,909,486 | B2 | | 6/2005 | Wang et al. | |
| 6,955,833 | B1 | | 10/2005 | Gallego | |
| 6,961,108 | B2 | | 11/2005 | Wang et al. | |
| 7,283,185 | B2 | * | 10/2007 | Hirakata et al. | 349/58 |
| 2010/0296027 | A1 | * | 11/2010 | Matsuhira et al. | 349/96 |

FOREIGN PATENT DOCUMENTS

| JP | 2005055641 | 3/2005 |
| WO | WO2004036270 | 4/2004 |

OTHER PUBLICATIONS

SYTEC Surface Specialties Inc., Uvekol S UV Curable Glass Laminating System, product spec sheet, May 4, 2006.
Pilkington Building Products North America, Pilkington OptiView Anti-Reflective Glass, product spec sheet, 2005.

* cited by examiner

*Primary Examiner* — James Dudek
(74) *Attorney, Agent, or Firm* — Standley Law Group LLP

(57) ABSTRACT

Exemplary embodiments provide a durable anti-reflective display panel for an electronic display. The panel may be used with any flat panel display including but not limited to LCD, plasma, and organic LED displays. Embodiments may contain anti-reflective glass containing pyrolytic coatings and may be bonded together using an index-matched optical adhesive. Exemplary embodiments can resist impact from objects at high speeds and protect the electronic display from damage. Embodiments also resist shattering to protect any bystanders.

20 Claims, 3 Drawing Sheets

Figure 2
See Figure 3
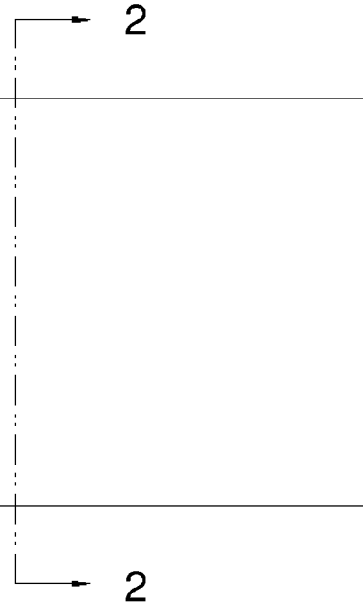
Figure 1
See Figure 4

DURABLE DISPLAY PANEL WITH IMPACT RESISTANCE

CROSS-REFERENCE TO RELATED APPLICATIONS

This non-provisional patent application claims priority to co-pending U.S. application Ser. No. 12/234,182 filed on Sep. 19, 2008 which is hereby incorporated by reference in its entirety.

TECHNICAL FIELD

Exemplary embodiments relate generally to a durable front glass panel for an electronic display.

BACKGROUND AND SUMMARY OF THE EXEMPLARY EMBODIMENTS

Electronic displays have become useful for not only indoor entertainment purposes, but are now being utilized for indoor and outdoor advertising/informational purposes. For example, liquid crystal displays (LCDs), plasma displays, organic light emitting diode (OLED) displays, and many other flat panel displays are now being used to display information and advertising materials to consumers in locations outside of their own home or within airports, arenas, stadiums, restaurants/bars, gas station pumps, bus stops, billboards, and even moving displays on the tops of automobiles or on the sides of trucks. Furthermore, the popularity of high-definition television (HDTV) has created a demand for high-quality displays where previously a lower quality would suffice.

The use of these electronic displays in public, outdoor environments poses several issues. One such issue is exposure to the elements. High winds may interact with a variety of objects and cause them to strike the display panel. A variety of liquids may also come into contact with the display panel. These liquids may include, but are not limited to rain, sleet, snow, and any number of consumer liquids such as alcohol, cleaning products, paint, acidic liquids, saliva, and soda. A further issue related to the use of these displays in public environments is the risk of vandalism. Some members of the public may choose to throw objects at the display, punch or kick the display, or paint/mark the display with various types of graffiti.

Thus, there exists a need for a front panel for an electronic display which can sustain impacts from various objects and liquids. Further, an exemplary panel should resist damage such as scratches or cracks. If the panel were to crack, an exemplary panel would not shatter, but would simply crack. Further, even if the panel were to crack or break, the object causing this damage should not be permitted to penetrate into the display.

There exists a need for a durable panel as described above, which can also satisfy the demanding requirements of outdoor usage for high-definition displays. Thus, an exemplary panel would have high clarity, such that the image from the display is not distorted. Further, an exemplary panel would have anti-reflective properties to account for interfering light sources such as sunlight and other light-producing devices (streetlights, vehicle lights, signs, decorative lights, and the reflections from any of these devices off any surrounding surfaces).

The exemplary embodiments herein disclosed are not intended to be exhaustive or to unnecessarily limit the scope of the embodiments. The exemplary embodiments were chosen and described in order to explain the principles so that others skilled in the art may practice the embodiments. Having shown and described exemplary exemplary embodiments, those skilled in the art will realize that many variations and modifications may be made to affect the described invention. Many of those variations and modifications will provide the same result and fall within the spirit of the exemplary embodiments. It is the intention, therefore, to limit the embodiments only as indicated by the scope of the claims.

BRIEF DESCRIPTION OF THE DRAWINGS

A better understanding of the exemplary embodiments will be had when reference is made to the accompanying drawings, wherein identical parts are identified with identical reference numerals, and wherein:

FIG. 1 is a front view of an exemplary embodiment of a display panel;

FIG. 2 is a cross-sectional view along the 2-2 line shown in FIG. 1;

DETAILED DESCRIPTION OF EXEMPLARY EMBODIMENTS

Turning to the drawings for a better understanding, FIG. 1 shows an exemplary display panel 10, which is comprised of several different layers. The cross-section line 2-2 is shown passing through the center of the display panel 10. The display panel 10 is preferably utilized as the exterior portion of a flat panel display assembly. Flat panel displays typically contain several layers. In LCDs for example, there may be several layers which comprise the LCD stack with further layers in front of the stack for the stack for polarizing light or index matching purposes. The display panel 10, although it is not required to be used as such, would preferably be used as the outer-most layer in the display assembly. Also shown in FIG. 1 is the detail circle which illustrates the detail view shown in FIG. 4.

FIG. 2 shows a cross-sectional view from the 2-2 cross-section shown in FIG. 1. Due to the scale of the figure it is difficult to discern the individual layers of the display panel 10. Thus, FIG. 2 contains the details circle which illustrates the detailed view shown in FIG. 3.

Figure 3:
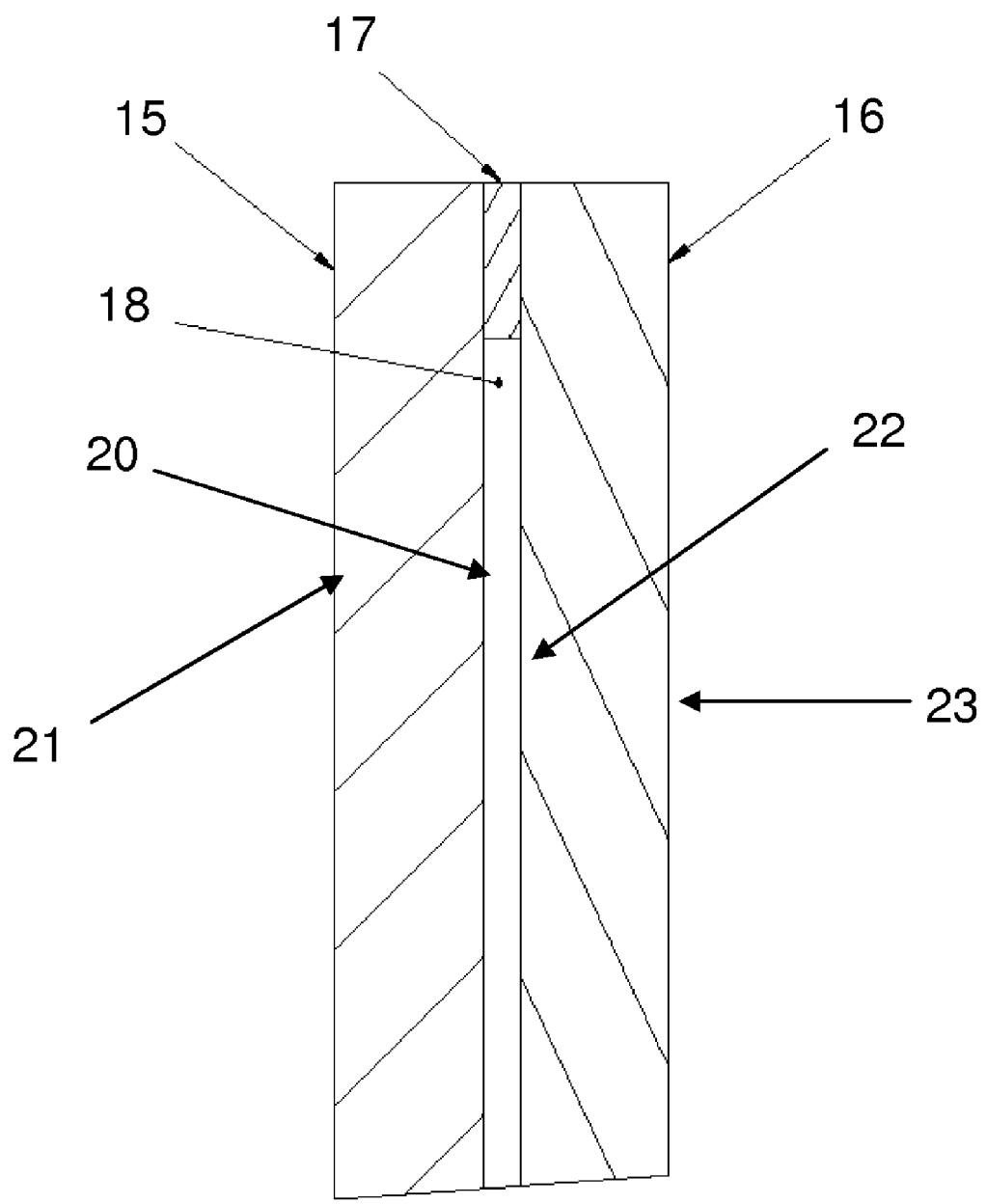
FIG. 3 is a detailed cross-sectional view from the view shown in FIG. 2.

FIG. 3 is a side view of the detail circle in FIG. 2, which was a cross section through section 2-2 of FIG. 1. The various layers of an exemplary embodiment are shown. A first layer of glass 15 and a second layer of glass 16 comprise the outer layers of the panel. Both glass 15 and 16 are preferably anti-reflective (AR) glass. Some embodiments may have one surface of the glass coated with an AR coating. Exemplary embodiments may have a pyrolytic surface as the AR coating. Further, embodiments may have a pyrolytic surface as the outer surface of the panel. Referring to FIG. 3, an exemplary embodiment would contain a pyrolytic surface on outer surfaces 23 and 21, where the opposite surfaces 20 and 22 are in contact with the adhesive 18.

An exemplary anti-reflective glass could be Pilkington OptiView™ glass which is commercially available from Pilkington Building and Specialty Glass Products of Toledo, Ohio (herein 'OptiView glass'). www.pilkinton.com The document "Pilkington OptiView™ Anti-Reflective Glass," Form No. 4483, is herein incorporated by reference in its entirety.

It should be noted, that any glass which meets the performance characteristics set by the OptiView glass would fall within the exemplary embodiments. OptiView glass was simply selected for exemplary purposes. Chart 1 provides typical performance characteristics for two pieces of glass, each with an anti-reflective pyrolytic coating on one side, where the two pieces of glass are laminated or bonded together. Currently, Pilkington Glass does not provide this dual-layered glass with two pyrolytic coatings. Users must purchase single pieces of glass with a single pyrolytic coating and laminate or bond the pieces themselves. See the Chart 1 Notes for specifics.

CHART 1

| Nominal Glass Thickness | Visible Light | | | Total Solar Energy | | | U-Factor | | | Solar Heat Gain Coefficient | Shading Coefficient |
|---|---|---|---|---|---|---|---|---|---|---|---|
| | Trans-mittance % | Reflectance % Outside | Reflectance % Inside | Trans-mittance % | Reflec-tance % | UV Trans-mittance % | U.S. Summer* | U.S. Winter* | European** | | |
| ¼ in | 92 | 1.7 | 1.7 | 70 | 3 | <1 | 0.68 | 0.81 | 4.7 | 0.77 | 0.89 |
| ½ in | 89 | 1.6 | 1.6 | 63 | 3 | <1 | 0.65 | 0.77 | 4.5 | 0.72 | 0.83 |

Notes:
¼" laminated glass: ⅛" OptiView™ (#1) + 0.030" clear pvb with 99% UV absorptance + ⅛" OptiView ™ (#4)
½" laminated glass: ¼" OptiView™ (#1) + 0.030" clear pvb with 99% UV absorptance + ¼" OptiView ™ (#4)
*Btu/hr · sq ft · ° F.
W/sq m · °K Adhesive 18 is used to bond the glass layers 15 and 16. An optical adhesive is preferably used to bond the glass together. Even more preferably, an index-matched optical adhesive may be used. Exemplary embodiments may utilize Uvecol® S adhesive, commercially available from Cytec Surface Specialties, Inc. of Smyrna, Ga. www.cytec.com. The document "Uvecol® S UV Curable Glass Laminating System," May 4, 2006, is herein incorporated by reference in its entirety. Embodiments may alternatively utilize Uvecol® A adhesive. In an exemplary embodiment, the glass layers 15 and 16 are laminated together by UV-curing the adhesive 18**.

Very High Bond (VHB) tape 17 may be used to seal around the edges of the glass 15 and 16. In an exemplary embodiment, the VHB tape 17 would be a clear acrylic tape in a thickness between 0.5 mm and 3.0 mm.

An exemplary display panel for small displays may utilize glass panels of thickness between 3.0-3.5 mm and VHB tape of thickness between 0.8-1.2 mm. An exemplary display panel for larger displays may utilize glass panels of thickness between 6.0-6.5 mm and VHB tape of thickness between 1.0-1.5 mm.

Figure 4:
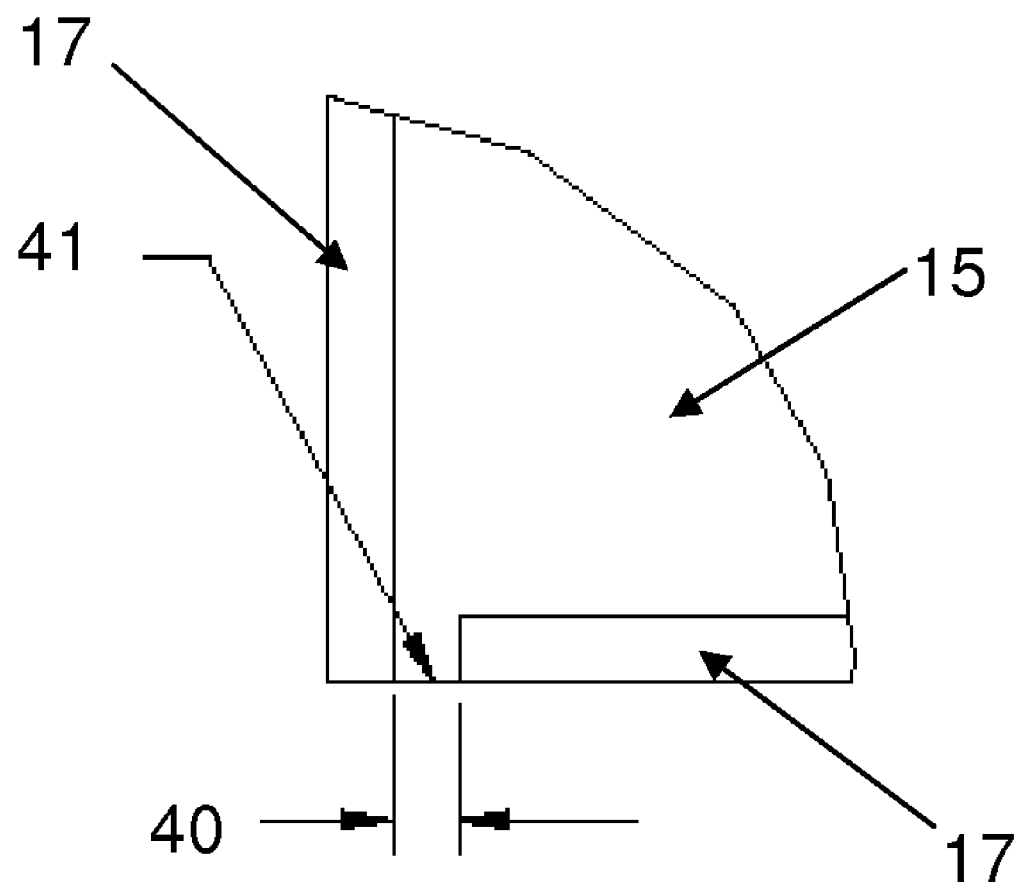
FIG. 4 is a front view of an exemplary embodiment with the front glass removed.

FIG. 4 shows the view of the detailed circle from FIG. 1 where the top piece of glass has been removed. In FIG. 4, the VHB tape 17 is shown encircling the edges of glass panel 15 to provide a seal between the two glass panels once assembled. A small gap 40 may be left open during the assembly process to allow the adhesive to drain from between the glass plates and the surrounding VHB tape seal. Once the excess adhesive has been permitted to drain, the gap 40 may be sealed by a second adhesive material 41. An exemplary second adhesive material 41 would be all temperature hot glue. It should be noted that the use of the small gap 40 is not necessary to an embodiment, but may be utilized for the prevention of any defects within the optical adhesive and during the curing of the optical adhesive.

It has been found that exemplary display panels can resist impact from a variety of objects at high speeds. Even when impacted by large objects at high speeds, the display panel may crack, but will not allow the object to penetrate into the display, causing damage to the expensive interior of the display. Further, embodiments resist cracking, but when struck at high speeds the panel may only crack and will not shatter. This shatter-proofing aspect of the embodiments prevents injury to persons who may be be in close proximity to the display when it is impacted. The above strength of the panel is accomplished while maintaining a clear panel for viewing an image, preferably a high-definition image. Also, the panel has a low percentage of reflectance, such that other light sources and reflections will not interfere with the viewing of the image produced by the display.

Having shown and described preferred embodiments, those skilled in the art will realize that many variations and modifications may be made to affect the described embodiments and still be within the scope of the claims. Thus, many of the elements indicated above may be altered or replaced by different elements which will provide the same result and fall within the spirit of the claimed embodiments. It is the intention, therefore, to limit the invention only as indicated by the scope of the claims.

What is claimed is:

1. A durable display panel for an electronic display comprising:
   a first glass panel with an anti-reflective surface;
   a second glass panel with an anti-reflective surface, said second panel is substantially parallel to and substantially aligned with said first glass panel;
   a layer of optical adhesive bonding the two glass panels; and
   a Seal between the two panels and running around the edges of the panels, sealing the optical adhesive between the two glass panels.

2. The display panel from claim 1 further comprising:
   a gap along said sealing perimeter adapted to allow excess optical adhesive to drain.

3. The display panel from claim 2 further comprising:
   a gap-filler adapted to close said gap once the excess optical adhesive has drained.

4. The display panel from claim 3 wherein:
   said gap-filler is hot glue.

5. The display panel from claim 1 wherein:
   the anti-reflective surfaces of said first and second glass panels is a pyrolytic surface.

6. The display panel from claim 5 wherein:
   the surface of said first and second glass panels which contacts said optical adhesive is opposite the pyrolytic surface.

7. The display panel from claim 1 wherein:
   said Seal is very high bond (VHB) tape.

8. The display panel from claim 1 wherein:
   said optical adhesive is an index-matched optical adhesive.

9. The display panel from claim 1 wherein:
said optical adhesive is UV-cured.

10. The display panel from claim 7 wherein:
said first and second glass panels are between 3.0 and 3.5 mm thick and
said VHB tape is between 0.8 and 1.2 mm thick.

11. The display panel from claim 7 wherein:
said first and second glass panels are between 6.0 and 6.5 mm thick and
said VHB tape is between 1.0 and 1.5 mm thick.

12. A liquid crystal display (LCD) with an intended observer comprising:
an LCD stack;
a display panel positioned between said LCD stack and an intended observer, said display panel comprising:
  a first glass panel with an anti-reflective pyrolytic surface and a surface opposite said pyrolytic surface;
  a second glass panel with an anti-reflective pyrolytic surface and a surface opposite said pyrolytic surface, said second panel is substantially parallel to and substantially aligned with said first glass panel with the surfaces opposite the pyrolytic surface being adjacent;
  a layer of optical adhesive disposed between the two glass panels;
  a sealing perimeter comprised of VHB tape between the two panels and running around the edges of the panels, sealing the optical adhesive between the two glass panels;
  a gap along said sealing perimeter adapted to allow excess optical adhesive to drain; and
  a gap-filler adapted to close said gap once the excess optical adhesive has drained.

13. The LCD from claim 12 wherein:
the percentage of reflectance of said display panel is less than 3 percent.

14. The display panel from claim 13 wherein:
said first and second glass panels are between 3.0 and 3.5 mm thick and
said VHB tape is between 0.8 and 1.2 mm thick.

15. The display panel from claim 13 wherein:
said first and second glass panels are between 6.0 and 6.5 mm thick and
said VHB tape is between 1.0 and 1.5 mm thick.

16. An electronic display with an intended observer comprising:
an image-producing assembly;
a display panel positioned between said image-producing assembly and an intended observer, said display panel comprising:
  a first glass panel with an anti-reflective surface and a surface opposite said anti-reflective surface;
  a second glass panel with an anti-reflective surface and a surface opposite said anti-reflective surface, said second panel is substantially parallel to and substantially aligned with said first glass panel with the surfaces opposite the anti-reflective surfaces being adjacent;
  a layer of optical adhesive disposed between the two glass panels; and
  a sealing perimeter comprised of VHB tape between the two panels and running around the edges of the panels, sealing the optical adhesive between the two glass panels.

17. The electronic display from claim 16 further comprising:
a gap along said sealing perimeter adapted to allow excess optical adhesive to drain; and
a gap-filler adapted to close said gap once the excess optical adhesive has drained.

18. The electronic display from claim 16 wherein:
said image-producing assembly is any one of the following: LCD, plasma, or organic LED assembly.

19. The display panel from claim 16 wherein:
the anti-reflective surface on the first glass panel is pyrolytic.

20. The display panel from claim 16 wherein:
the anti-reflective surface on the second glass panel is pyrolytic.

\* \* \* \* \*